United States Patent [19]

Tingley

[11] Patent Number: 5,565,257
[45] Date of Patent: Oct. 15, 1996

[54] METHOD OF MANUFACTURING WOOD STRUCTURAL MEMBER WITH SYNTHETIC FIBER REINFORCEMENT

[76] Inventor: Daniel A. Tingley, 3310 SW. Willamette Ave., Corvallis, Oreg. 97333

[21] Appl. No.: 269,004

[22] Filed: Jun. 30, 1994

Related U.S. Application Data

[63] Continuation-in-part of Ser. No. 37,580, Mar. 24, 1993, Pat. No. 5,362,545.

[51] Int. Cl.$^6$ .............................. B32B 5/08; B32B 21/08; E04C 3/12; E04C 3/26; E04C 3/29
[52] U.S. Cl. ...................... 428/114; 52/223.8; 52/309.16; 52/730.1; 52/730.7; 52/DIG. 7; 156/178; 156/306.9; 156/307.7; 428/213; 428/294; 428/902
[58] Field of Search ............................ 52/223.8, 309.16, 52/730.1, 730.7, DIG. 7; 156/178, 306.9, 307.7; 428/114, 213, 294, 902

[56] References Cited

U.S. PATENT DOCUMENTS

| | | | |
|---|---|---|---|
| 2,536,183 | 1/1951 | Jamieson | 428/525 |
| 3,413,188 | 11/1968 | Allen . | |
| 3,890,077 | 6/1975 | Holman | 425/111 |
| 4,108,351 | 8/1978 | Hough | 229/62 |
| 4,242,406 | 12/1980 | El Bouhnini et al. | 428/236 |
| 4,312,162 | 1/1982 | Medney | 52/309.16 |
| 4,615,163 | 10/1986 | Curtis et al. | 52/730 |
| 4,965,973 | 10/1990 | Engebretsen | 52/223 R |
| 5,000,808 | 3/1991 | Deviney | 156/178 |
| 5,006,390 | 4/1991 | Kavesh et al. | 428/105 |
| 5,026,593 | 6/1991 | O'Brien | 428/215 |
| 5,135,793 | 8/1992 | Socha | 428/74 |

FOREIGN PATENT DOCUMENTS

4149346  5/1992  Japan .

OTHER PUBLICATIONS

Rowlands et al., "Fiber-Reinforced Wood," *Wood and Fiber Science*, Jan. 1986, V. 18(1), pp. 39–57.

Wood Design Focus, A Newsletter of Contemporary Wood Engineering, vol. 4, No. 2, Summer 1993, R. J. Leichti, Editor.

Von de Kuilen, Proceedings of the 1991 International Timber Engineering Conference, vol. 3, Sep. 2–5, 1991, pp. 226–233.

Tingley, Proceedings of the 1988 International Conference on Timber Engineering, vol. 1, Sep. 19–22, 1988, pp. 422–427.

Tingley, Reinforced Glued–Laminated Wood Beams, 96 page Thesis acccepted Nov, 1987 by the University of New Brunswick (Canada) as partial fulfillment for M.S. Eng., Dept of Civil Engineering.

Tingley, "Predicting Strength Criteria for Kevlar and Fiberglass Reinforced Plastic (KRP & FRP) Glued Laminated Beams," pp. 301–304 from vol. 2 of the Proceedings of the Second *Pacific Engineering Conference*, 1989.

*Primary Examiner*—James C. Cannon
*Attorney, Agent, or Firm*—Stoel Rives LLP

[57] ABSTRACT

An elongated wood structural member or beam for bearing predetermined loads transverse to the lengths of the members preferably includes multiple elongate wood segments bonded together with their lengths generally aligned with the beam length as in a glue-laminated members. The predetermined load corresponds to a resisting moment that produces compressive and tensile stresses in the structural member in respective compression and tension portions of the beam on opposite sides of a neutral axis. A synthetic tension reinforcement having multiple synthetic fiber strands held within a resin matrix is adhered to at least one of the wood segments in the tension portion of the structural member and is selected to be substantially capable of bearing the tensile stress produced by the resisting moment and cooperates with the wood segments to position the neutral axis within the beam. As a result, the width and depth of the structural member and relative positions of the neutral axis and reinforcement may be selected to establish a compression portion of the structural member in which compressive stress from the resisting moment does not exceed a predetermined maximum compressive stress.

13 Claims, 3 Drawing Sheets

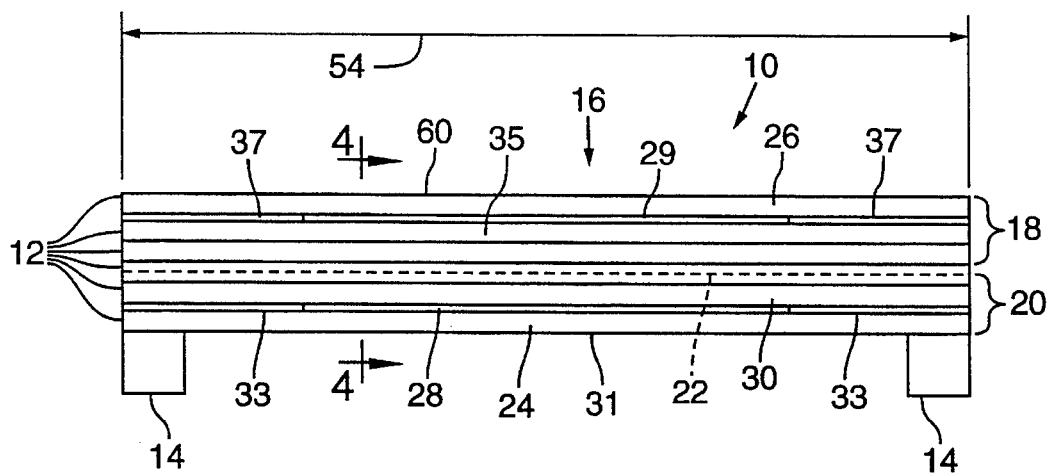
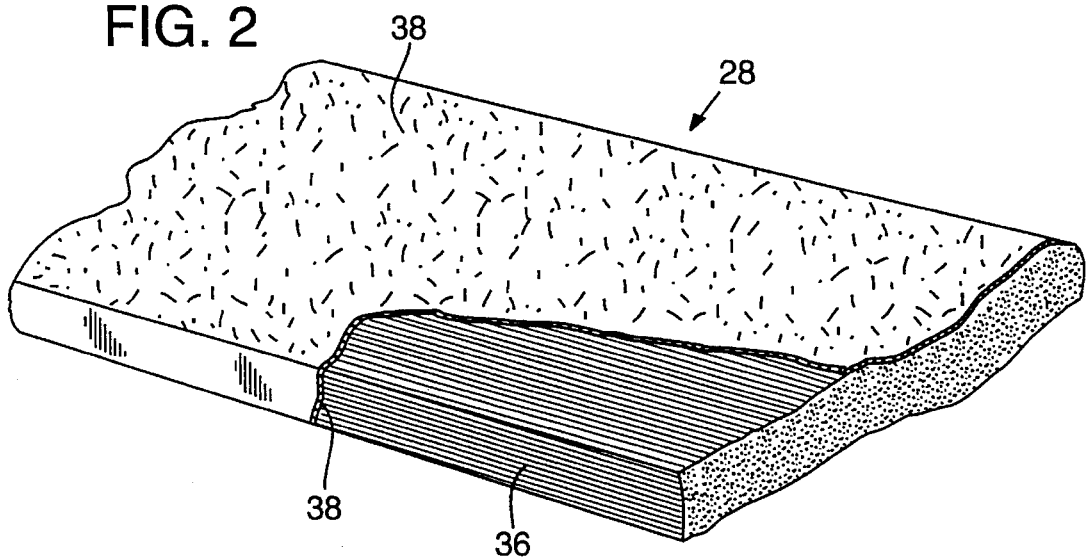

METHOD OF MANUFACTURING WOOD STRUCTURAL MEMBER WITH SYNTHETIC FIBER REINFORCEMENT

RELATED APPLICATION

This application is a continuation-in-part of U.S. patent application Ser. No. 08/037,580, filed Mar. 24, 1993 for "Aligned Fiber Reinforcement Panel for Structural Wood Members, now U.S. Pat. No. 5,362,545."

TECHNICAL FIELD

The present invention relates to wood structural members reinforced with fiber panels and, in particular, to manufacturing wood structural members with predetermined load capabilities.

BACKGROUND OF THE INVENTION

Beams, trusses, joists, and columns are the typical structural members that support the weight or loads of structures, including buildings and bridges. Structural members may be manufactured from a variety of materials, including steel, concrete, and wood, according to the structure design, environment, and cost.

Wood structural members are now typically manufactured from multiple wood segments that are bonded together, such as in glue-laminated members, laminated veneer lumber, parallel strand lumber and I-beams. These manufactured wood structural members have replaced sawn lumber or timbers because the former have higher design limits resulting from better inspection and manufacturing controls. Wood is a desireable material for use in many structural members because of its various characteristics, including strength for a given weight, appearance, cyclic load response, and fire resistance.

In any application, a load subjects a structural member to both compressive and tensile stresses, which correspond to the respective compacting and elongating forces induced by the load in opposite sides of the member. By convention, a neutral plane or axis extends between the portions of the member under compression and tension. The structural member must be capable of bearing the compressive and tensile stresses without excessive strain and particularly without ultimately failing.

Wood structural members have generally similar stress characteristics in tension and compression. A characteristic of wood structural members under extreme loads, however, is that ultimate failure in bending is usually initiated by failure in the tension portion due to localized defects such as knots, slope of grain, or finger joints. By comparison, the compression portion can withstand higher applied loads because columnar action or plastic shift in that portion of the member allows larger loads without initiating ultimate failure of the member. Accordingly, the conventional practice is to manufacture wood structural members to have adequate tension portions to bear the required tensile stresses in bending, which include a predetermined margin of safety.

SUMMARY OF THE INVENTION

An object of the present invention is, therefore, to provide wood structural members with improved stress-resisting capabilities.

Another object of this invention is to provide such wood structural members with both tensile and compressive portions adapted to the stresses imposed by a selected load.

A further object of this invention is to provide a method of manufacturing such wood structural members.

The present invention includes elongated wood structural members, particularly beams, for bearing predetermined loads transverse to the lengths of the members. A wood structural member of a preferred embodiment includes multiple elongate wood segments bonded together with their lengths generally aligned with the beam length as in glue-laminated members, laminated veneer lumber, parallel strand lumber and I-beams. The predetermined load corresponds to a resisting moment that produces compressive and tensile stresses in the structural member in respective compression and tension portions of the beam on opposite sides of a neutral axis.

A synthetic tension reinforcement having multiple synthetic fiber strands held within a resin matrix is adhered to at least one of the wood segments in the tension portion of the structural member. The synthetic tension reinforcement is selected to be substantially capable of bearing the tensile stress produced by the resisting moment and cooperates with the wood segments to position the neutral axis within the beam. As a result, the width and depth of the structural member and relative positions of the neutral axis and reinforcement may be selected to establish a compression portion of the structural member in which compressive stress from the resisting moment does not exceed a predetermined maximum compressive stress. In contrast, the width and depth of conventional wood structural members are selected to form a tension portion in which tensile stress does not exceed a predetermined maximum.

With synthetic tension reinforcement substantially capable of bearing the tensile stress produced by the resisting moment, the width and depth of the wood structural beam can be selected according to the compressive stress in the compression portion of the beam. Since the yielding of wood fibers in the compression portion does not lead to ultimate failure of the member, larger applied loads can be withstood before the member ultimately fails and the dimensions of the wood structural member can be less than they would be in a beam without the synthetic tension reinforcement. Less wood or lower grade wood provides the required strength to bear the selected load, thereby decreasing the cost of the wood structural member to the point of being competitive with equivalent steel and concrete members.

The present invention also includes a method of manufacturing such wood structural members. In a preferred embodiment, the method includes selecting a width, depth, and synthetic reinforcement from a predetermined set of widths, depths and synthetic reinforcements and incrementally modifying them until a resisting moment of the member is sufficient for an applied load moment. In addition, shear and stiffness of the wood structural member are also characterized.

Additional objects and advantages of this invention will be apparent from the following detailed description of preferred embodiments thereof which proceeds with reference to the accompanying drawings.

BRIEF DESCRIPTION OF THE DRAWINGS

FIG. 1 is an elevation view of an exemplary laminated wood beam having synthetic fiber reinforcement according to the present invention.

FIG. 2 is a perspective view of a section of a portion of a synthetic fiber reinforcement with a portion cut-away to show the alignment and orientation of fibers in the reinforcement.

DETAILED DESCRIPTION OF THE PREFERRED EMBODIMENTS

Figure 3:
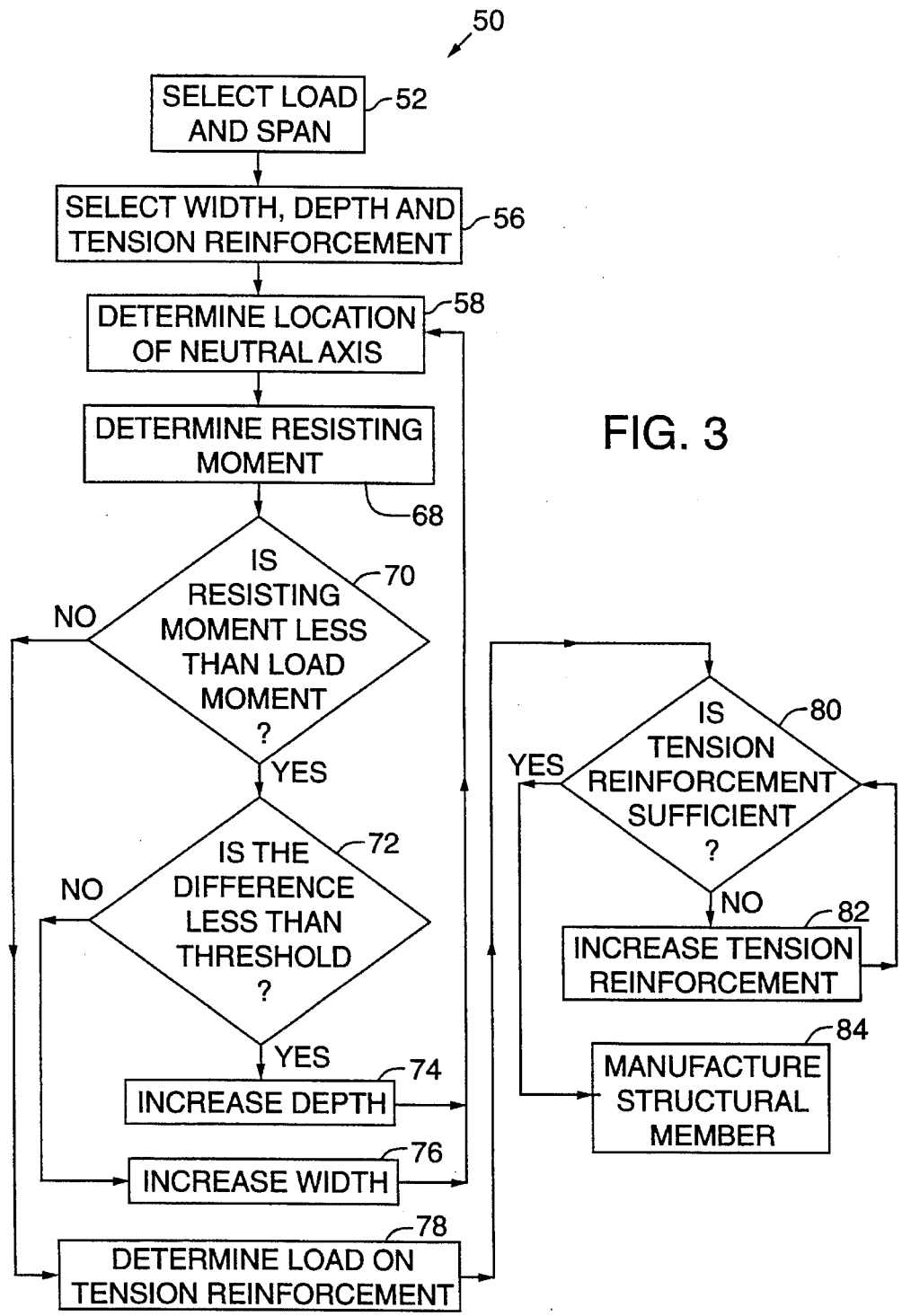
FIG. 3 is a flow diagram showing a process for manufacturing the laminated wood beam of FIG. 1 so that both tensile and compressive portions are adapted to the stresses imposed by a predetermined load.

FIG. 1 shows a glue laminated wood structural member 10 having multiple wood laminae 12 that are bonded together and are preferably elongate boards. In this configuration, wood beam 10 is configured as a glue-laminated timber according to manufacturing standards 117–93 of the American Institute of Timber Construction (AITC) of Englewood, Colo. Although this is a preferred configuration of wood structural member 10, the following description is similarly applicable to other wood structural members, including laminated veneer lumber, parallel strand lumber and wood I-beams.

A typical structural use of wood structural member 10 is to extend as a beam over and bear a load along an otherwise open region. As a simplified, exemplary representation of such use, wood structural member 10 is shown with its ends supported by a pair of blocks 14 and bearing a point load 16 midway between blocks 14. The product of the force corresponding to load 16 and its distance from one of blocks 14 represents a moment applied to wood structure member 10. The load moment is balanced or equaled by a resisting moment that produces compressive and tensile stresses in wood beam 10 in respective compression and tension portions 18 and 20 of structural member 10 on opposite sides of a neutral axis 22.

Under the conditions represented in FIG. 1, a lowermost lamina 24 is subjected to a substantially pure tensile stress, and an uppermost lamina 26 is subjected to a substantially pure compressive stress. To increase the tensile load-bearing capacity of wood structural member 10, at least one layer of synthetic tension reinforcement 28 is adhered between lowermost lamina 24 and a next adjacent lamina 30 or, alternatively, to only the outer surface 31 of lowermost lamina 24.

According to the present invention, synthetic tension reinforcement 28 is substantially capable of bearing the tensile stress produced by the resisting moment in wood structural member 10, depending on load 16. Synthetic tension reinforcement 28 is generally centered about load 16 and preferably extends along about two-fifths to three-fifths the length of wood structural member 10, depending on load 16. A pair of wood spacers 33 are positioned at opposite ends of synthetic tension reinforcement 28 between laminae 24 and 30 to maintain a uniform separation therebetween. Synthetic tension reinforcement 28, being substantially capable of bearing the tensile stress produced by the resisting moment, allows wood structural member 10 to have a width 32 and a depth 34 selected according to the compressive stress in the compression portion of the structural member, as described below in greater detail.

FIG. 2 is an enlarged perspective view of one layer of preferred synthetic tension reinforcement 28 having a large number of synthetic fibers 36 that are arranged parallel to one another and aligned with the length of synthetic tension reinforcement 28. A resin material 38 surrounds and extends into the interstices between synthetic fibers 36 to maintain them in their arrangement and alignment. To facilitate its adhesion to laminae 24 and 30, synthetic tension reinforcement 28 is preferably manufactured and treated as described in copending U.S. patent application Ser. No. 08/037,580, filed Mar. 24, 1993, which is hereby incorporated by reference.

The parallel arrangement and longitudinal alignment of the fibers 36 provides synthetic tension reinforcement 28 with maximal strength. Suitable for use as synthetic fibers 36 are aramid fibers, which are commercially available from E. I. DuPont de Nemours & Co. of Delaware under the trademark "KEVLAR," and high modulus polyethylene which is available under the trademark "SPECTRA" from Allied Fibers of Allied Signal, Petersberg, Va. A preferred grade of synthetic fibers 36 is an aramid fiber available as "KEVLAR 49." Resin material 38 used in fabrication of synthetic tension reinforcement 28 is preferably an epoxy resin, but could alternatively be other resins such as polyester, vinyl ester, phenolic resins, polyimides, or polystyrylpyridine (PSP) or thermoplastic resins such as polyethylene terephthalate (PET) and nylon-66.

Synthetic fibers 36 preferably have a modulus of elasticity in tension that is relatively high. For example, synthetic fibers 36 of Kevlar™ have a modulus of elasticity in tension of about $18 \times 10^6$ psi (124,000 MPa). Synthetic reinforcement 28 comprising about 60 percent synthetic fibers 36 to 40 percent resin material 38 (by volume) has a modulus of elasticity in tension of about $11 \times 10^6$ psi (75,900 MPa).

FIG. 3 is a flow diagram showing a process 50 for manufacturing wood structural member 10 so that both tensile and compressive portions are adapted to the stresses imposed by load 16. Synthetic tension reinforcement 28 is selected to be substantially capable of bearing the tensile stress produced by the resisting moment and cooperates with wood laminae 12 to position neutral axis 22 within wood structural member 10. As a result, width 32 and depth 34 of wood beam 10 may be selected to establish in compression portion 18 compressive stress from the resisting moment of no more than a predetermined maximum compressive stress.

For purposes of illustration, process 50 will be described with reference to the simplified representation of structural use of wood structural member 10 shown in FIG. 1. It will be appreciated, however, that this description does not reflect a limitation on the structural use of wood beam 10 or process 50. Wood structural member 10 and process 50 could alternatively be used in a wide variety of other load and support configurations, including distributed and nonperpendicular loads and asymmetric or cantilevered support configurations.

Process block 52 indicates that load 16 and a span length 54 for wood structural member 10 are selected. Load 16 and span length 54 correspond to a maximum load moment which, in the load configuration of FIG. 1, may be calculated as the product of load 16 and one-half span length 54. The maximum load moment will induce in structural member 10 a corresponding maximum resisting moment that produces compressive and tensile stresses in wood structural member 10 in respective compression and tension portions 18 and 20 on opposite sides of neutral axis 22.

Process block 56 indicates that in accordance with the maximum load moment, a width, depth, and tension reinforcement are selected from respective predetermined sets of working structure widths, working structure depths, and working tension reinforcements for placement against at least one of laminae 12 in tension portion 20 of wood structural member 10.

The set of working structure widths correspond to predetermined widths of wood structural member 10. The set of working structure depths correspond to the number of laminae 12 in wood structural member 10. The working tension reinforcements correspond to the number of layers, position, and length of tension reinforcement 28. The width, depth, and longitudinal reinforcement may be initially selected, for example, from a predefined table according to the maximum load moment.

Figure 4:
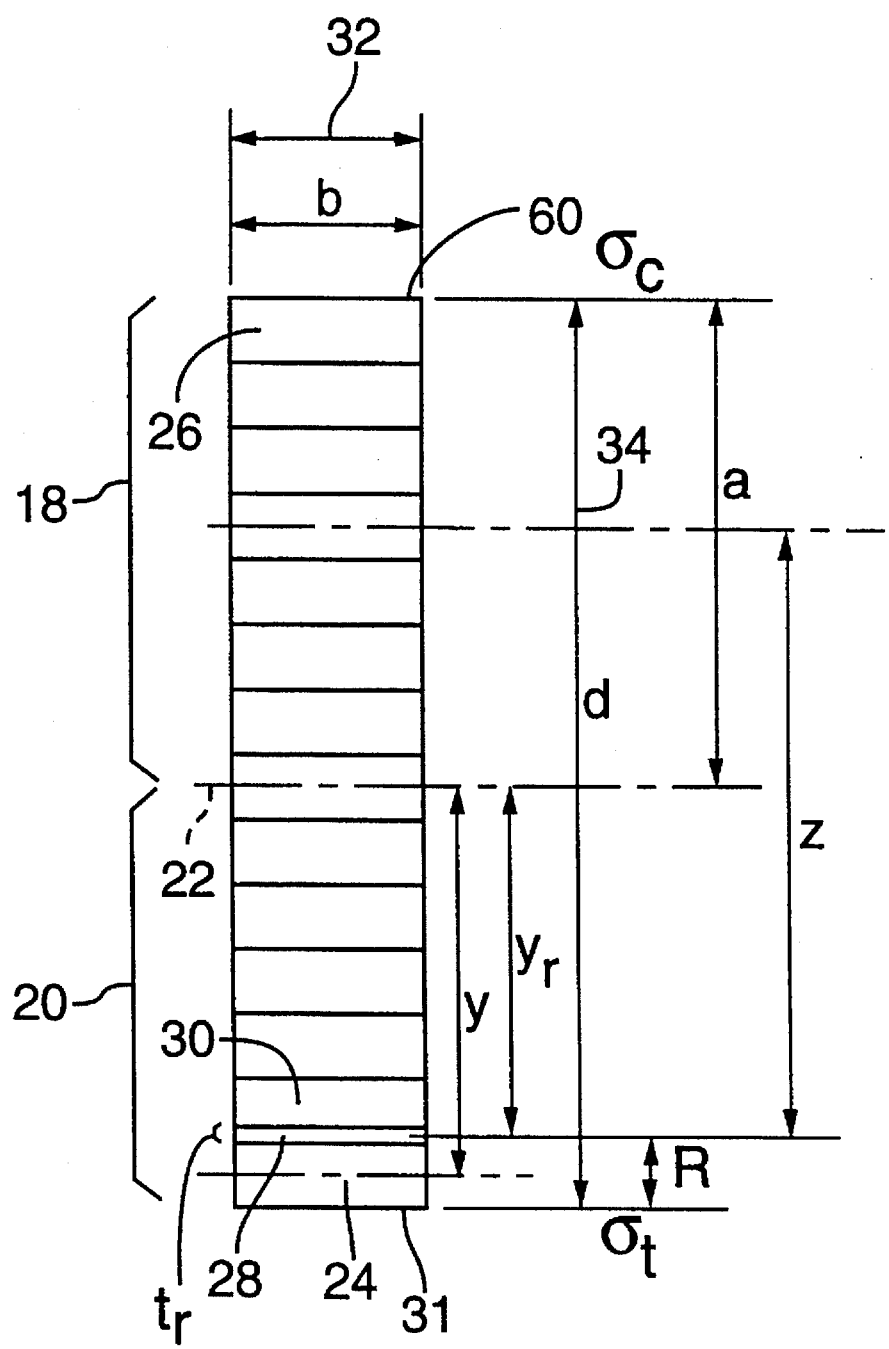
FIG. 4 is a sectional end view of the wood laminated beam along the line 4—4 in FIG. 1.

Process block 58 indicates that a location of neutral axis 22 between compression and tension portions 18 and 20 is calculated. Referring to FIG. 4, which is a sectional end view of wood structural members 10 along the line 4—4 in FIG. 1, the location of neutral axis 22 may be calculated as a distance "a" from compression surface 60 as:

$$a = a' + M - N,$$

where a' is the location of a neutral axis 22 in a conventional, unreinforced wood structural member calculated as the distance from its compression surface:

$$a' = dn^{1/2}/(1+n^{1/2})$$

in which "d" is the depth of the beam, "n" is the ratio of the moduli of elasticity of the wood in tension and compression (i.e., $MOE(w)_t/MOE(w)_c$). The remaining factors in the calculation of the location of neutral axis 22 in wood structural member 10 are:

$$M = n(n'-1)t_r$$

$$N = nR(n'-1)t_r/a',$$

in which n' is the ratio of the modulus of elasticity in tension of tension reinforcement 28, $MOE(r)_t$, over the modulus of elasticity of wood in bending, $MOE(w)_b$, $t_r$ is the thickness of tension reinforcement 28, and R is the distance from tension surface 31 to the center of tension reinforcement 28. Reinforcement 28 typically effects a change in the position of neutral axis 22, or the difference between the factors "a" and a' ranging between 1 and 25 percent of the depth d of wood structural member 10.

The ratio "n" of the moduli of elasticity of the wood in tension and compression is tabulated and is dependent upon various factors, including the wood species, as is known in the art. For example, a commonly accepted ratio "n" for a solid sawn Douglas fir wood structural member 10 is 1.06. This ratio is dependent upon the grade/strength and location of wood fibers in member 10, as is known in the art. The modulus of elasticity in tension $MOE(r)_t$ of tension reinforcement 28 comprising Kevlar™ is $11 \times 10^6$ psi (75,900 MPa). The modulus of elasticity of wood in bending $MOE(w)_b$ of an unreinforced member may be calculated as the average of the moduli of elasticity of wood in tension and compression ($MOE(w)_t$ and $MOE(w)_c$), which are commonly tabulated values for $MOE(w)_b$. Exemplary thicknesses $t_r$ of tension reinforcement 28 are 0.066, 0.090, and 0.146 in. (1.68, 2.29, and 3.71 mm).

Process block 68 indicates that the resisting moment $M_r$ of wood structural member 10 in compression portion 18 is calculated as:

$$M_r = F_c'abz$$

in which "a" is the location of neutral axis 22, "b" is the width of wood structural member 10, and "z" is the moment arm of the reinforcement and is calculated as:

$$z = d - R - a/2.$$

The factor $F_c'$ is the standard allowable compression design value (parallel to wood grain) in psi for glued laminated timber, as set forth in the 1991 National Design Specification promulgated by the National Forest Products Association of Washington, D.C. and referred to as "NDS-91." The factor $F_c'$ may be calculated as:

$$F_c' = F_c C_d C_m C_t C_f$$

in which $F_c$ is the standard tabulated compression design value (parallel to wood grain) in psi for glued laminated timber from NDS-91, $C_d$ is a load duration adjustment factor, $C_m$ is a wet service adjustment factor, $C_t$ is a temperature adjustment factor, and $C_f$ is a size adjustment factor, all as set forth in NDS-91.

Decision block 70 represents an inquiry as to whether the resisting moment $M_r$ is less than the load moment. If so, decision block 70 proceeds to decision block 72. If not, decision block 70 proceeds to process block 78.

Decision block 72 represents an inquiry as to whether the resisting moment $M_r$ is less than the load moment by an amount less than a first predetermined difference threshold. If so, decision block 72 proceeds to process block 74. If not, decision block 70 proceeds to process block 76.

Process block 74 indicates that whenever the resisting moment $M_r$ is less than the load moment by an amount less than or equal to a first predetermined difference threshold, the depth of wood structural member 10 is incrementally increased from the set of working structure depths and process block 74 returns to process block 58.

Process block 76 indicates that whenever the resisting moment $M_r$ is less than the load moment by an amount greater than a first predetermined difference threshold, which includes construction restrictions, the initial width is incrementally increased from the set of working structure widths and process block 76 returns to process block 58.

Process block 78 indicates that whenever the resisting moment $M_r$ is greater than or equal to the load moment, the load in tension carried by tension reinforcement 28 is calculated. As an initial step in this calculation, a reinforcing tensile stress in tension reinforcement 28 is calculated as the product of the modulus of elasticity of tension reinforcement 28 $MOE(r)_t$ and the predetermined allowable strain σ in the wood laminae adjacent tension reinforcement 28, typically 0.8%–0.9%, according to the wood species, as is known in the art.

Since wood structural member 10 is balanced between tension and compression, the resultant compression force $F_{RC}$ equals the resultant tension force $F_{RT}$, which may therefore be represented as the product of the allowable factored compression stress $F_c'$ and the area under compression "ab." As a result, the load in tension carried by tension reinforcement 28 is calculated as:

$$F_{RT} = F_{RC} = F_c'a/(MOE(r)_t t_r).$$

Decision block 80 represents an inquiry as to whether tension reinforcement 28 is substantially capable of bearing the applied load in tension without exceeding a strain limit of, for example, 0.8 percent to 0.9 percent. For example, tension reinforcement 28 with synthetic fibers 36 of KEVLAR™ aramid has a tensile strength of 200,000 psi (1380 MPa), which represents the ultimate stress tension reinforcement 28 can bear without failure. If not, decision block 80 proceeds to process block 82. If so, decision block 80 proceeds to decision block 84.

Process block 82 indicates that whenever the reinforcing tensile stress in tension reinforcement 28 is not substantially capable of bearing the tensile stress corresponding to load 16, the tension reinforcement 28 is increased from the set of working reinforcements and process block 82 returns to process block 80. This determination includes an exemplary adequate safety factor of 2.0 by which the tensile strength of tension reinforcement 28 is multiplied.

Process block 84 indicates that process 50 is complete and wood structural member 10 may be manufactured according to the depth, width, and tension reinforcement obtained from the set of working depths, widths, and reinforcements.

Process 50 determines the depth, width, and tension reinforcement 28 of wood structural member 10 sufficient to satisfy the moment requirements of load 16, which are typically the main strength criteria for wood structural member 10. However, other design features and standards can be considered, such as the strength-related shear resistance of wood beam 10. It will be appreciated, however, that tension reinforcement 28 typically provides less enhancement of shear resistance in wood structural member 10 than of resisting moment $M_r$ or overall strength. The reason is that the tension reinforcement 28 is positioned typically in an area of high tensile stress and correspondingly low shear stress.

As a basic consideration of the shear capability of wood structural member 10, regardless of the amount or position of tension reinforcement 28, the shear stress $\tau_r$ at any point longitudinally between the reinforcement and an adjacent laminae may be calculated as:

$$\tau_r = VQY/(I_r'b)$$

in which V is the maximum applied shear across tension reinforcement 28, Q is the cross sectional area opposite the shear zone and may be calculated as the product of the distance R (FIG. 4) from tension surface 31 to the center of tension reinforcement 28 and the width b of wood structural member 10, y (FIG. 4) is the distance from the geometric center axis of area Q to neutral axis 22.

The factor $I_r'$ is the adjusted composite moment of inertia of wood beam 10 and may be calculated as:

$$I_r' = I_r + t_r bn'(n''-1)(d-a-R)^2$$

in which n" is the ratio of the shear modulus $G_r$ of tension reinforcing 28 over shear modulus $G_w$ of the wood in laminae 12, the former being determined experimentally and the latter being determined either experimentally or by reference to the Wood Handbook, promulgated by the Forest Products Laboratory of Madison, Wis. The factor $I_r$ is the moment of inertia of wood structural member 10 and is calculated according to the parallel Iaxis theorem in conventional mechanics as:

$$I_r = bd^3/12 + bn't_r^3/12 + bt_b^3/12 + bd(d-a)^2 + bn't_r(d-a-R)^2 + bt_b(d-a-t_b/2)^2$$

The adjustment of moment of inertia $I_r$ of wood beam 10 to obtain $I_r'$ reflects the effects on the shear stress $\tau_r$ of the nonhomogenous shear moduli of wood and tension reinforcing 28.

The calculated shear stress $\tau_r$ of wood structural member 10 must be less than a design allowable factored shear as set forth in NDS-91 at any cross sectional point and particularly at neutral axis 22. If the shear stress $\tau_r$ calculated for wood structural member 10 is greater than that specified as allowable and its moment characteristics govern its configuration, tension reinforcement 28 may be added to wood structural member 10, process 50 repeated, and the shear stress $\tau_r$ again calculated and compared to the allowable specification. If the shear stress $\tau_r$ calculated for wood structural member 10 is greater than that specified as allowable and its deflection characteristics govern its configuration, as described below, wood laminae 12 may be added to wood structural member 10, process 50 repeated, and the shear stress $\tau_r$ again calculated and compared to the allowable specification. These iterations may be repeated until wood structural member 10 has an appropriate shear stress $\tau_r$ to meet the allowable specification.

Two alternative specific shear stress considerations of wood structural member 10 with tension reinforcement 28 extending along only a portion of the length of wood structural member 10 are a summed shear approach and a resultant tension force approach. In the summed shear approach, wood structural member 10 is configured so that the total shear force resistance to movement between tension reinforcement 28 and adjacent wood laminae 12 ($V_{FR}$) is greater than the sum of the shear applied along the length of tension reinforcement 28 ($V_{FA}$). The total shear force resistance $V_{FR}$ may be calculated as:

$$V_{FR} = b_r L_r F_v'$$

in which $b_r$ and $L_r$ are the respective width and length of tension reinforcement and $F_v'$ is the factored allowable shear resistance of unreinforced wood structural member 10, as set forth in NDS-91.

In the resultant tension force approach, wood structural member 10 is configured so that the resultant tension force in tension reinforcement 28 ($F_{RT}$) is less than the product of the standard allowable compression design value (parallel to wood grain) $F_c'$ as set forth in NDS-91 and the width $b_r$ and length $L_r$ of tension reinforcement 28. The resultant tension force in the reinforcement $F_{RT}$ may be calculated as indicated above with reference to process block 78.

Another standard to be considered is the stiffness of wood structural member and its corresponding compatibility with related building or structural components. For example, gypsum wallboard that is connected to wood structural member 10 could be damaged if wood structural member 10 had insufficient stiffness and was able to bend or deflect more than is allowed under certain building standards. Unlike the moment considerations of process 50 and the shear considerations, stiffness relates to building material compatibility standard rather than a literal strength characteristic of wood structural member 10.

The stiffness of wood structural member 10, which is represented as the product of its modulus elasticity of in bending (E) and its moment of inertia (I), may be calculated as the product of E and I:

$$EI = E_{wbdg}(I_{ub} + I_{ro} + I_w + A_{rt}Y_r + A_{wt}Y_w^2)$$

in which $E_{wbdg}$ is the modulus of elasticity in bending set forth in NDS-91 according to the grade of wood used in laminae 12 and $I_{ub}$ is the moment of inertia for an unreinforced wood structural member with the dimensions of wood structural member 10. The remaining moment of inertia factors, which are typically negligible and can be ignored, are $I_{ro}$ as the moment of inertia of the reinforcement about its own neutral axis (not shown) and $I_w$ as the moment of inertia of the portion of wood structural member 10 between its geometric center axis (not shown) and neutral axis 22.

The remaining factors may be calculated as follows. The factor $A_{rt}$ is the product of the cross-sectional area of tension reinforcement 28 ($t_rb$) and n', the ratio of the modulus of elasticity in tension of the initial longitudinal reinforcement MOE(r)$_t$ over the modulus of elasticity in bending of the wood MOE(w)$_b$. Similarly, the factor A$_{wt}$ is the product of the cross-sectional area of wood structural member 10 between neutral axis 22 and the neutral axis of a corresponding unreinforced wood structural member (i.e., the difference between factors "a" and a' described with reference to process block 58) and n, the ratio of the moduli of elasticity of the wood in tension and compression (MOE(w)$_t$/MOE(w)$_c$). Referring to FIG. 4, the factor Y$_r$ is the distance from tension reinforcement 28 to neutral axis 22, and the factor Y$_w$ is the distance from the center of the area corresponding to the factor A$_{wt}$ to neutral axis 22.

Once the stiffness (EI) of wood structural member 10 is calculated, the anticipated deflection may also be calculated by conventional, as is known, and compared to the specific requirements of the application such as, for example, the Uniform Building Code promulgated by the International conference on Building Officials (ICBO) of Whittier, Calif. If the stiffness (EI) calculated for wood structural member 10 is less than that specified as allowable and its moment characteristics govern its configuration, tension reinforcement 28 may be added to wood structural member 10, process 50 repeated, and an the stiffness (EI) again calculated and compared to the allowable specification. If the stiffness (EI) calculated for wood structural member 10 is less than that specified as allowable and its deflection characteristics govern its configuration, wood laminae 12 may be added to wood structural member 10, process 50 repeated, and the stiffness (IE) again calculated and compared to the allowable specification. In either situation, tension reinforcement 28 may be added to wood structural member 10 if a maximum depth of it is a design or construction specification. These iterations may be repeated until wood structural member 10 has sufficient stiffness (EI) to meet the allowable specification.

It will be obvious to those having skill in the art that many changes may be made to the details of the above-described embodiment of this invention without departing from the underlying principles thereof. The scope of the present invention should be determined, therefore, only by the following claims.

I claim:

1. A method of constructing a reinforced wood structural member comprised of plural panels of a predetermined variety and grade of wood for bearing a predetermined load applied along a first axis, the reinforced wood structural member having a depth along the first axis, a length along a longitudinal axis transverse to the first axis, and a width along a second axis transverse to the first and longitudinal axes, and the reinforced wood structural member including compression and tension portions positioned on either side of a neutral axis, compressive and tensile stresses created by the predetermined load in the respective compression and tension portions, and a synthetic reinforcement placed in a predetermined position in the tension portion, the method comprising the steps of:

selecting a synthetic reinforcement having a modulus of elasticity, length, thickness, and tensile strength, the tensile strength withstanding the tensile force caused by the load:

determining a depth of the reinforced wood structural member having a nominal starting width, the depth being of a value that is, at minimum within a predetermined margin of depth that is sufficient to prevent the compressive stress created in the compression portion of the reinforced structural member from exceeding a predetermined stress level;

modifying, if necessary, the nominal starting width of the reinforced wood structural member to derive a width sufficient to prevent the compressive stress created in the compression portion from exceeding the predetermined stress level, and the depth and width of the reinforced wood structural member and the modulus of elasticity, length, and thickness of the synthetic reinforcement providing a reinforced wood structural member having a predetermined stiffness;

assembling a stack of plural elongate laminae with the lengths generally aligned with the longitudinal axis, the laminae including plural panels of the predetermined variety and grade of wood and the synthetic reinforcement placed in the predetermined position, and the stack having the depth determined and width derived for the reinforced wood structural member; and bonding together the laminae in the stack to form the reinforced wood structural member.

2. The method of claim 1 in which the synthetic reinforcement is comprised of at least two layers of resin encased fibers, the layers adhesively bonded together.

3. The method of claim 1 in which the depth and the width of the reinforced wood structural member and the tensile strength of the synthetic reinforcement are chosen so that the compressive stress caused by the load in the compression portion of the reinforced wood structural member is greater than a predetermined minimum.

4. The method of claim 1 in which the depth and width of the reinforced wood structural member and the modulus of elasticity, length, and thickness of the synthetic reinforcement are selected to prevent a predetermined shear stress from causing the reinforced wood structural member to fail.

5. The method of claim 1 in which the depth and the width of the reinforced wood structural member and the modulus of elasticity of the synthetic reinforcement are chosen so that the compressive stress caused by the load in the compression portion of the reinforced wood structural member is greater than a predetermined minimum.

6. A reinforced wood structural member constructed in accordance with the method of claim 1.

7. A method of constructing, from a predetermined variety and grade of wood, a wood structural member for bearing a predetermined load along a first axis, the wood structural member having a depth along the first axis, a length along a longitudinal axis transverse to the first axis, a width along a second axis transverse to the first and longitudinal axes, and in which the predetermined load creates compressive and tensile stresses in the structural member in respective compression and tension portions on opposite sides of a neutral axis, the method comprising:

assembling a stack of plural elongate laminae with their lengths generally aligned with the longitudinal axis, the laminae having widths and including panels of the predetermined variety and grade of wood and a synthetic reinforcement placed in the tension portion, the stack having in the compression portion an area that prevents the compressive stress created in the compression portion by the load from exceeding a predetermined level, the compressive stress defining a compressive force in the area, and the synthetic reinforcement having a thickness and a width selected to withstand a tensile force caused by the compressive force created in the compression portion; and adhering together the laminae of wood panels and the synthetic reinforcement to form the reinforced wood structural member.

8. The method of claim 7 in which the synthetic reinforcement is comprised of at least two layers of resin encased fibers, the layers adhesively bonded together.

9. The method of claim 7 in which the synthetic reinforcement has a tensile strength and in which the depth and the width of the wood structural member and the tensile strength, thickness, and width of the synthetic reinforcement are chosen so that the compressive stress caused by the load in the compression portion of the wood structural member is greater than a predetermined minimum.

10. The method of claim 7 in which the synthetic reinforcement has a modulus of elasticity and a length and in which the depth and width of the wood structural member and the modulus of elasticity, length, and thickness of the synthetic reinforcement are selected to prevent a predetermined shear stress from causing the wood structural member to fail.

11. The method of claim 7 in which the synthetic reinforcement has a modulus of elasticity and a length and in which the depth and width of the wood structural member and the modulus of elasticity, length, and thickness of the synthetic reinforcement are selected to construct a wood structural member having a predetermined stiffness.

12. The method of claim 7 in which the synthetic reinforcement has a modulus of elasticity and in which the depth and the width of the wood structural member and the modulus of elasticity of the synthetic reinforcement are chosen so that the compressive stress caused by the load in the compression portion of the wood structural member is greater than a predetermined minimum.

13. A wood structural member constructed in accordance with the method of claim 7.

* * * * *

UNITED STATES PATENT AND TRADEMARK OFFICE
CERTIFICATE OF CORRECTION

PATENT NO. : 5,565,257
DATED : October 15, 1996
INVENTOR(S) : Daniel A. Tingley

It is certified that error appears in the above-indentified patent and that said Letters Patent is hereby corrected as shown below:

Column 4, line 25, change "106" to --$10^6$--.

Column 4, line 28, change "106" to --$10^6$--.

Column 5, line 55, change "0,066" to --0.066--.

Column 5, line 55, change "0,099" to --0.099--.

Column 7, line 29, change "$\tau_r = VQY/(I_r'b)$" to --$\tau_r = VQy/(I_r'b)$--.

Column 8, line 51, change "$EI = E_{wbdg}(I_{ub} + I_{ro} + I_w + A_{rt}Y_r + A_{wt}Y_w^2)$" to --$EI = E_{wbdg}(I_{ub} + I_{ro} + I_w + A_{rt}y_r + A_{wt}y_w^2)$--.

Column 9, line 11, change "$Y_w$" to --$y_w$--.

Column 9, line 18, change "conference" to --Conference--.

Column 9, line 23, after "and" delete "an".

Column 9, line 60, change "load:" to --load;--.

Column 9, line 63, after "minimum" insert --,--.

Signed and Sealed this

Fifteenth Day of April, 1997

Attest:

BRUCE LEHMAN

*Attesting Officer*     *Commissioner of Patents and Trademarks*